US012061341B2

(12) United States Patent
Schultz et al.

(10) Patent No.: US 12,061,341 B2
(45) Date of Patent: Aug. 13, 2024

(54) COLOR CORRECTION FOR VIRTUAL IMAGES OF NEAR-EYE DISPLAYS

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 614 days.

(21) Appl. No.: 17/422,067

(22) PCT Filed: Jan. 9, 2020

(86) PCT No.: PCT/US2020/012821
§ 371 (c)(1),
(2) Date: Jul. 9, 2021

(87) PCT Pub. No.: WO2020/146559
PCT Pub. Date: Jul. 16, 2020

(65) Prior Publication Data
US 2022/0099975 A1 Mar. 31, 2022

Related U.S. Application Data

(60) Provisional application No. 62/790,367, filed on Jan. 9, 2019.

(51) Int. Cl.
*G02B 27/01* (2006.01)
*G02B 3/00* (2006.01)

(52) U.S. Cl.
CPC ....... *G02B 27/0172* (2013.01); *G02B 3/0062* (2013.01); *G02B 2027/0118* (2013.01); *G02B 2027/0178* (2013.01)

(58) Field of Classification Search
CPC ...... G02B 3/00; G02B 3/0062; G02B 3/0075; G02B 27/01; G02B 27/017;
(Continued)

(56) References Cited

U.S. PATENT DOCUMENTS 7,390,097 B2 6/2008 Magarill
8,649,099 B2 2/2014 Schultz et al.
(Continued)

FOREIGN PATENT DOCUMENTS

JP 2004184641 A 7/2004
JP 2005-241825 A 9/2005
(Continued)

OTHER PUBLICATIONS

Michael Pate, Fly's Eye Arrays for Uniform Illumination in Digital Projector Optics, Zemax, LLC. White Paper, Jul. 24, 2014, p. 1-9.
(Continued)

*Primary Examiner* — Sultan Chowdhury
(74) *Attorney, Agent, or Firm* — Harter Secrest & Emery LLP; Jacob D. Merrill, Esq.

(57) ABSTRACT

A near-eye display for conveying virtual images within a real-world view includes a projector arranged to compensate for undesirable color gradients in the virtual images. The projector includes an illuminator with an extended light source having a plurality of cells each containing different color light sources and a partial homogenizer for partially overlapping light from the plurality of cells at an illumination plane of a spatial light modulator. A controller adjusts the color outputs of the cells to provide a color distribution over the illumination plane to compensate for the color gradients within the virtual images.

20 Claims, 8 Drawing Sheets

(58) Field of Classification Search
CPC ............ G02B 27/0101; G02B 27/0172; G02B 27/0178; G02B 2027/0112; G02B 2027/0118; G02B 2027/0178; G09G 3/36; G09G 3/3406; G09G 3/3413; G09G 3/3426; G09G 3/3603; G09G 3/3607; G09G 2320/062; G09G 2320/0646; G09G 2320/0693; G09G 2320/0242; G09G 2320/0285

See application file for complete search history.

(56) References Cited

U.S. PATENT DOCUMENTS

| | | | |
|---|---|---|---|
| 9,819,917 | B2 | 11/2017 | Otani |
| 10,360,829 | B2 | 7/2019 | Lin et al. |
| 10,365,490 | B2 | 7/2019 | Hayashi et al. |
| 10,378,882 | B2 | 8/2019 | Yeoh et al. |
| 11,029,523 | B2 | 6/2021 | Travers |
| 2002/0196414 | A1 | 12/2002 | Manni et al. |
| 2004/0114250 | A1 | 6/2004 | Kato |
| 2008/0013182 | A1 | 1/2008 | Ferber |
| 2011/0213664 | A1 | 9/2011 | Osterhout et al. |
| 2012/0062998 | A1 | 3/2012 | Schultz et al. |
| 2014/0247591 | A1 | 9/2014 | Miura |
| 2016/0041396 | A1 | 2/2016 | Kawamura et al. |
| 2016/0097930 | A1 | 4/2016 | Robbins et al. |
| 2016/0187654 | A1 | 6/2016 | Border et al. |
| 2017/0293143 | A1 | 10/2017 | Martinez et al. |
| 2019/0318677 | A1* | 10/2019 | Lu ..................... G02B 27/0093 |
| 2019/0339605 | A1* | 11/2019 | Asuma .................. G03B 21/16 |
| 2020/0203324 | A1* | 6/2020 | Shin .................... H01L 25/0753 |

FOREIGN PATENT DOCUMENTS

| | | |
|---|---|---|
| JP | 2006-133635 A | 5/2006 |
| JP | 2008-287048 A | 11/2008 |
| JP | 2012-118291 A | 6/2012 |
| JP | 2017-058388 A | 3/2017 |
| WO | 2018/013307 A1 | 1/2018 |

OTHER PUBLICATIONS

United States Patent & Trademark Office (ISA/US), International Search Report and Written Opinion in International Patent Application No. PCT/US2020/012821, dated Mar. 19, 2020.

* cited by examiner

COLOR CORRECTION FOR VIRTUAL IMAGES OF NEAR-EYE DISPLAYS

TECHNICAL FIELD

The present disclosure relates to projection systems for near-eye displays that convey virtual color images to viewers such as from a color image projector through an image light guide to the viewer's eye.

BACKGROUND

Near-eye displays, which are often incorporated into head-mounted displays (HMDs), some designed to model conventional eyeglasses, generally include an image source, such as a projector, and specially designed optics for conveying virtual images of the image source to the wearer's eyes. The specially designed optics can include image light guides with transparent waveguides that support both the wearer's natural view of the ambient environment as well as the propagation of the virtual images to the wearer's eyes. The virtual images can be projected into the wearer's field of view, which is particularly useful for augmented reality (AR) applications.

In such conventional image light guides, collimated, relatively angularly encoded light beams from an image projector are coupled into an optically transparent planar waveguide by an in-coupling optic such as a diffractive optic, which can be mounted or formed on a surface of the planar waveguide or buried within the waveguide. After propagating along the planar waveguide, the angularly encoded light beams can be directed out of the planar waveguide toward a viewer's eye by a similar out-coupling optic. Upon exiting the waveguide, the angularly encoded light beams overlap within a region of space referred to as an "eyebox" within which the virtual images of the image source can be seen. The eyebox can be expanded to reduce sensitivity to the position of the viewer's eye by dividing each of the angularly encoded light beams into a plurality of spatially offset beamlets that collectively occupy larger areas. The beamlets can be produced by multiple encounters of the angularly encoded beams with optics including the out-coupling optic along the waveguide, where each such encounter successively apportions a part of the optical energy of each beam into such a beamlet.

The conveyance of color images from the image projector to the eyebox can be subject to wavelength sensitive performance disparities of the intervening optical components. The effects of both refraction and diffraction can be wavelength sensitive. One overall effect of such performance disparities can be a color shift in the virtual images presented to the viewer. For example, for a completely white image generated by the image projector, the virtual image can appear to have a reddish hue to one side, e.g. the right side, of the virtual image while the opposite side, e.g. the left side, of the virtual image can appear to have a blueish hue.

In addition to such a horizontal gradient, other orientations of such a color gradient can also occur, e.g. a vertical top-to-bottom color gradient, or a diagonal bottom-left-to-top-right or top-left-to-bottom-right color gradient. The color gradient can also appear as an isolated region within the virtual image. Color gradients can also occur due to manufacturing variabilities of waveguides and waveguide components, and/or the manufacture of the projector system and its components, as well as the operating environment of the near-eye display components, including heat and/or moisture.

Thus, it can be appreciated that there would be advantages to a near-eye display system that can adjust color distributions within the virtual images.

SUMMARY

Embodiments provide for rebalancing color distributions within the virtual images visible from near-eye displays. Features include an extended light source divided into cells with different color light sources within each cell and a partial homogenizer that only partially overlaps light fields from the cells at an illumination plane at which a spatial light modulator is positioned for generating images for display. While the different light fields mostly overlap at the illumination plane, the different light fields can be sufficiently displaced to contribute to slightly different portions of an illumination pattern at the spatial light modulator. By controlling the relative color output of individual cells, the images formed by the spatial light modulator for input into a near-eye display can be generated with color imbalances that can compensate for color imbalances that would otherwise be present in the resulting virtual images made visible by the near-eye displays.

A projector for a near-eye display can be arranged with an extended light source having a plurality of cells each containing different color light sources that are adjustable for varying the relative color output of the individual cells. A partial homogenizer collects light from different cells within different optical channels and partially overlaps the light from the different optical channels at an illumination plane. A spatial light modulator located at the illumination plane generates real images by selectively modulating the partially overlapping light at the illumination plane. An eyepiece optic directs the modulated light from the spatial light modulator toward a pupil for conveying virtual images of the generated real images for viewing by a viewer. A controller of the extended light source adjusts the relative color output of one or more of the cells to alter a color distribution of the light over the illumination plane incident to the spatial light modulator.

The different color light sources within each zone can include light sources that emit at least three different bands of wavelengths with the relative light output of the different bands of wavelengths being relatively adjustable. The controller can provide for relatively reducing the relative output of one of the bands of wavelengths within a first set of the cells and can provide for relatively increasing the relative output of the one band of wavelengths within a second set of the cells. The light from the first and second sets of cells can be relatively offset within the illumination plane.

The partial homogenizer can include a condenser for partially overlapping the light from the different optical channels at the illumination plane in a position that is offset from a focal plane of the condenser. The partial homogenizer can also include a first array lens and a second array lens for transmitting the light from the different cells within the different optical channels. The first array lens and the second array lens can comprise respective arrays of lenslets, and the first array lens can direct light collected from the different cells into respective apertures of the lenslets of the second array lens. The condenser can be arranged with respect to the first and second array lenses for imaging lenslet apertures of the first array lens array in an overlapping manner at a homogenization plane from which the illumination plane is offset. Overall, the partial homogenizer can provide for collecting light from the different cells within the different optical channels and for overlapping the different optical channels by at least 60 percent at the illumination plane wherein at least some of the different optical channels overlap by no more than 90 percent at the illumination plane.

In addition to controlling the relative color output of the individual cells for adjusting color distributions over the illumination plane, the controller can also provide for controlling radiant energy outputs of the cells to adjust light intensity distributions over the illumination plane incident to the spatial light modulator. The controller can also provide for dimming the one or more light cells otherwise illuminating portions of the spatial light modulator that are not being used for image formation A near-eye display can be arranged with an illuminator including an extended source having a plurality of cells each containing different color light sources and a partial homogenizer for partially overlapping the light from the plurality of cells at an illumination plane. A spatial light modulator located at the illumination plane generates real images by selectively modulating the partially overlapping the light at the illumination plane. An eyepiece optic directs the modulated light from the spatial light modulator toward a pupil as a plurality of relatively angularly encoded light beams. An image light guide comprises a transmissive waveguide with in-coupling and out-coupling optics in an arrangement such that the in-coupling optic directs the angularly encoded light beams into the waveguide for propagating along the waveguide to the out-coupling optic at which the angularly encoded light beams are directed out of the waveguide to an eyebox within which virtual images of the real images generated by spatial light modulator output can be viewed. A controller of the extended light source adjusts the relative color output of one or more of the cells for changing a color distribution of the light over the illumination plane incident to the spatial light modulator to compensate for color shifts within the virtual images.

The partial homogenizer can provide for collecting light from different cells within different optical channels and for overlapping the different channels by at least 60 percent at the illumination plane but at least some of the different channels overlap by no more than 90 percent at the illumination plane. The partial homogenizer can include a condenser for partially overlapping the light from different cells at the illumination plane in a position that is offset from a focal length of the condenser. In addition, the partial homogenizer can include a first array lens with lenslets for collecting light from the individual cells, a second array lens with lenslets having respective apertures within which the collected light from the individual cells is directed. The condenser can be arranged with respect to the first and second array lenses for imaging lenslet apertures of the first array lens array in an overlapping manner at a homogenization plane from which the illumination plane is offset.

The different color light sources within each zone can include light sources that emit at least three different bands of wavelengths with the relative light output of the different bands of wavelengths being adjustable. The controller can provide for relatively reducing the relative output of one of the bands of wavelengths within a first set of the cells and can provide for relatively increasing the relative output of the one band of wavelengths within a second set of the cells. Light from the first and second sets of cells can relatively offset within the illumination plane.

The controller can also provide for adjusting radiant energy outputs of one or more of the cells to alter a light intensity distribution over the illumination plane incident to the spatial light modulator to adjust light intensity distributions over the virtual images. The controller can also provide for dimming the one or more light cells otherwise illuminating portions of the spatial light modulator that are not being used for image formation to increase the display contrast.

BRIEF DESCRIPTION OF THE DRAWING FIGURES

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who wears and/or views images using an electronic device.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Figure 1:
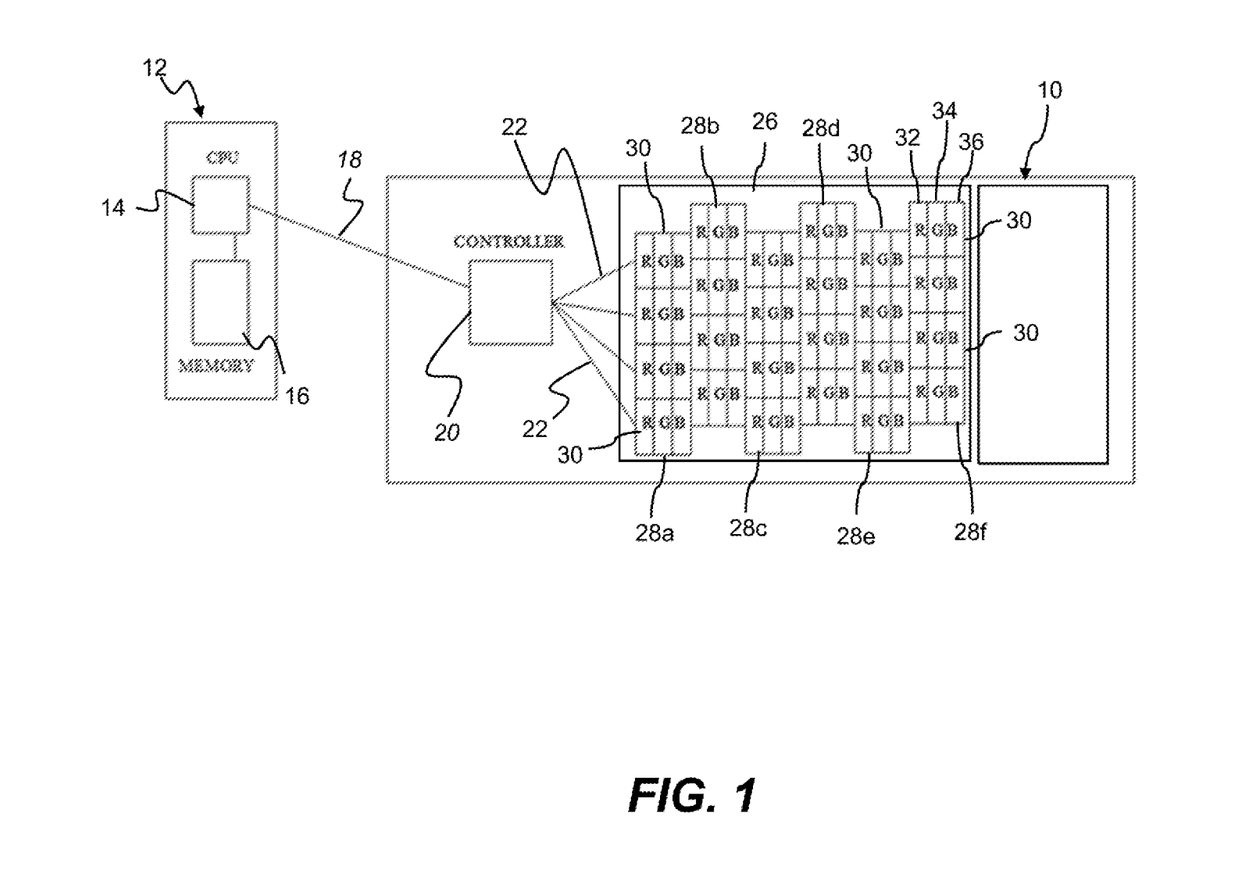
FIG. 1 is a layout of an extended light source under control of a computer as a part of an illumination system in a projector for a near-eye display according to an embodiment of the present disclosure.

The diagram of FIG. 1 shows an extended light source 10 connected to a computer 12 as a part of an illuminator for color balancing virtual images of a near-eye display. The computer 12 includes a computer processing unit (CPU) 14 and a memory 16 and is interconnected with the extended light source 10 through a communication path 18 that extends between the CPU 14 and a controller 20 of the extended light source 10.

In addition to the controller 20, the extended light source 10 includes a plurality of light source cells 30 shown here in a two-dimensional array 26 with vertically staggered columns 28a through 28f. Each light source cell 30 includes a red light source 32, a green light source 34, a blue light source 36, which can take the form of light emitting diodes (LEDs or other light sources known to those skilled in the art). Controller 20 controls the radiant energy output of each individual light source 32, 34, 36 of each light source cell 30 along communication paths 22. In this way, the relative color output of each cell 30 can be controlled as well as color gradients across and within the two-dimensional array 26 of the extended light source 10. For example, the extended light source 10 can produce a horizontal color gradient from a left most vertical column 28a of light source cells 30 to the right most vertical column 28f of light source cells 30. Such a color gradient can vary, for example, from a shade of red from the left most vertical column 28a to a shade of blue at the right most vertical column 28f. Other orientations of the color gradient are also possible, e.g., a vertical top-to-bottom color gradient, or a diagonal bottom-left-to-top-right or top-left-to-bottom-right color gradient. The color gradient can also appear as an isolated region within the two-dimensional array 26 in other color gradient patterns across the vertical and/or horizontal extent of the two-dimensional array 26. In addition, color gradients can extend only over a portion of the two-dimensional array 26, e.g., in the lower left region of the two-dimensional array 26, or in the center region of the two-dimensional array 26. Generally, the gradients are drawn as a function of wavelength, e.g., from shorter to longer wavelengths, but other color transitions are possible.

White light can be perceived by a viewer from an additive combination of red "R", green "G", and blue "B" light in a given ratio as expressed from the following expression:

$$\text{white light} = nRW\ R + nGW\ G + nBW\ B$$

Where nRW, nGW, nBW are respective ratios needed of each component color R, G, and B to produce the perceived white light. Each light source cell 30 of the extended light source 10 can produce white light by adjusting the radiant energy outputs of the red light source 32, the green light source 34, and the blue light source 36 in accordance with the respective ratios. Other colors of the visible spectrum can be reproduced by the individual cells 30 by adjusting the R, G, and B outputs in different ratios. Additional color light sources can be added to each cell 30 to assist with digital color conversions.

Figure 2:
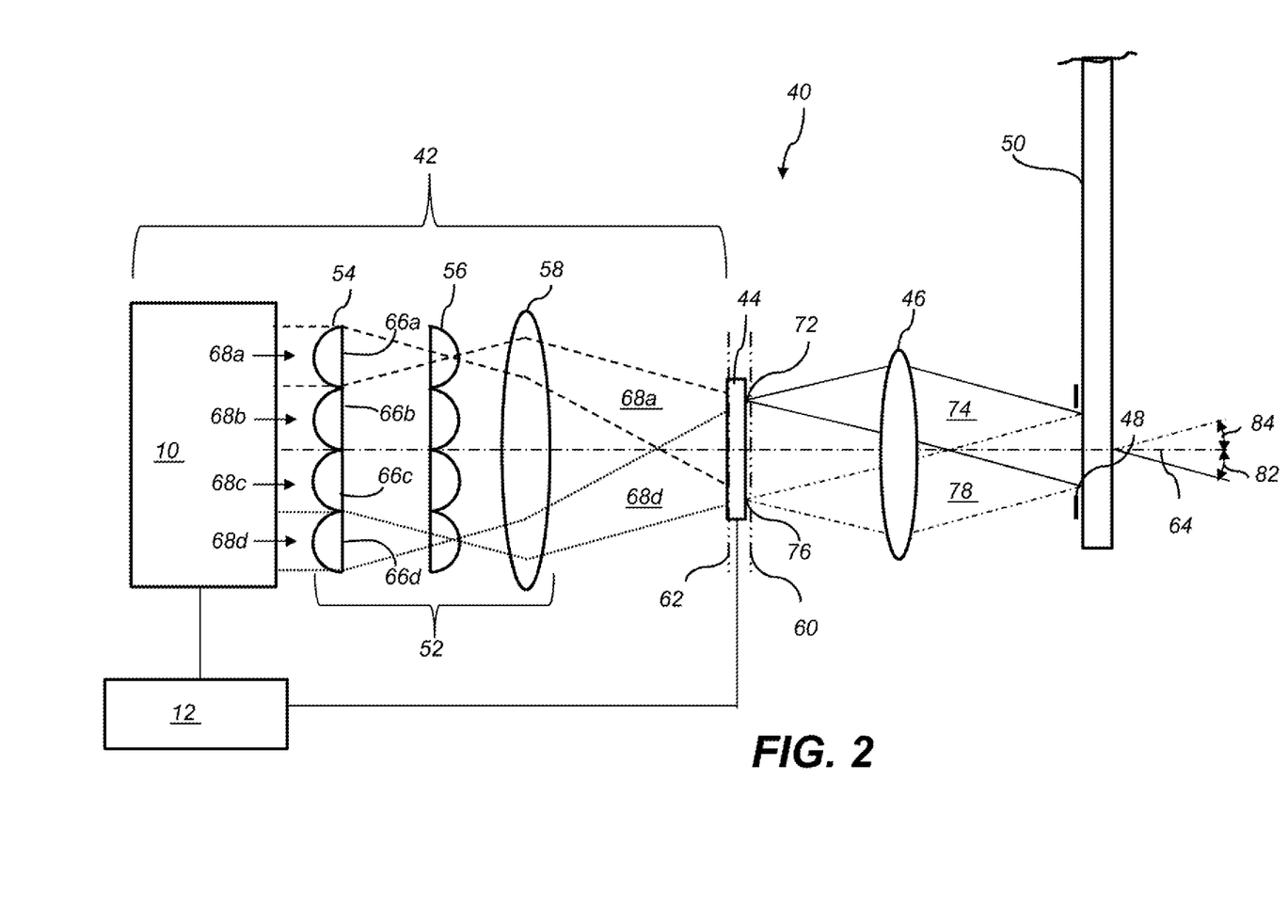
FIG. 2 is an optical diagram of a projector for a near-eye display incorporating the extended light source of FIG. 1.

The diagram of FIG. 2 shows an example of a projector 40 for color balancing virtual images injected into an image light guide 50 of a near-eye display. The projector 40 includes an illuminator 42, which includes the extended light source 10, a spatial light modulator 44 under control of the computer 12 for generating images, and an eye piece optic 46 for forming a pupil 48 that is relayed and expanded by the image light guide 50 for viewing the generated images as virtual images.

The illuminator 42 is arranged for backlighting the spatial light modulator 44, which is of the transmissive type such as a liquid crystal display (LCD). The illuminator 42 could also be arranged for front-lighting the spatial light modulator 44 of a reflective type such as a digital micromirror array (DMD). Included within the illuminator 42 is a partial homogenizer 52, shown as an imaging type homogenizer with two array lenses 54 and 56 and a condenser 58 for overlapping inputs to the first array lens 54 at a homogenization plane 60. However, the spatial light modulator 44 is positioned within an illumination plane 62 that is offset from the homogenization plane 60 along an optical axis 64 of the projector 40 so that only partial homogenization takes place at the spatial light modulator 44. The array lenses 54 and 56 can be arranged as fly's eye or microlens arrays with lenslets of the array lenses arranged in a two dimensional array.

Each of the depicted lenslets 66a-66d constituting one of a plurality of columns of the first array lens 54 collects light from one or more of the light source cells 30 of the extended light source 10 for establishing a plurality of light channels 68a-68d. The second array lens 56 together with the condenser 58 partially overlaps the light from the different optical channels 68a-68d at the illumination plane 62, which is offset from the homogenization plane 60 at which the channels 68a-68d would more completely overlap. For clarity of illustration, only two of the channels 68a and 68d are traced through the partial homogenizer 52 to positions of partial overlap at the illumination plane 62. The homogenization plane 60 can be located at the focal plane of the condenser 58, and the illumination plane 62, which is defined by the location of the spatial light modulator 44, is offset from this focal plane to decrease the amount of overlap between the channels 68a-68d at the spatial light modulator 44. Preferably, the channels 68a-68d overlap by at least 60 percent but at least some of the channels overlap by no more than 90 percent at the illumination plane 62.

The partial homogenizer 52 as an imaging type homogenizer can be arranged such that the first array lens 54 directs the collected light from individual cells 30 into respective apertures of the lenslets of the second array lens 56, and the condenser 58 is arranged with respect to the first and second array lenses 54 and 56 for imaging the lenslet apertures of the first array lens 54 in an overlapping manner at the homogenization plane 60 from which the illumination plane 62 is offset. Additional optics associated with the extended light source 10 can be arranged for directing light from different cells 30 or different cell groups into different lenslet apertures of the first array lens 54 for establishing the different light channels 68a-68d that are partially overlapped at the illumination plane 62. Diffusers and other forms of mixing optics can be used to combine the different color light outputs from the red, green, and blue light sources 32, 34, and 36 of the individual cells 30.

The spatial light modulator 44 located at the illumination plane 62 generates images by selectively modulating the partially overlapping light at the illumination plane 62 on a pixel-by-pixel basis. The eyepiece optic 46 directs the modulated light from the spatial light modulator 44 toward the pupil 48 and into the image light guide 50 for conveying a virtual image of the spatial light modulator output in a form visible to a viewer. Generally, each modulated pixel of the spatial light modulator 44 fills the pupil 48 as a substantially collimated beam that is angularly encoded in two orthogonal dimensions according to the spatial position at which the pixel is modulated within the spatial light modulator 44. For example, the eyepiece optic 46 converts a pixel 72 at one side of the spatial light modulator 44 into a collimated beam 74 filling the pupil 48 through a first inclination angle 82 to the optical axis 64 of the projector 40 and converts a pixel 76 at an opposite side of the spatial light modulator 44 into a collimated beam 78 filling the pupil 48 through a second inclination angle 84 that is oppositely inclined to the optical axis 64.

By controlling the color mixtures within the different light channels 68a-68d that partially overlap at the spatial light modulator 44, color gradients can be programmatically generated across the spatial light modulator 44 to compensate for color imbalances otherwise present in the virtual image presented to the viewer.

Figure 3A:
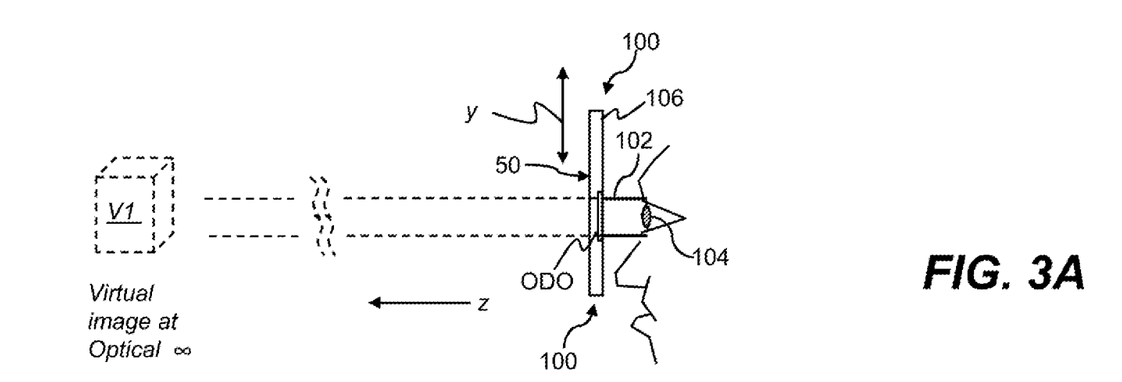
FIG. 3A is a side view of a near-eye display arranged for use with the projector of FIG. 2 for viewing a virtual image within a real-world field of view.
Figure 3B:
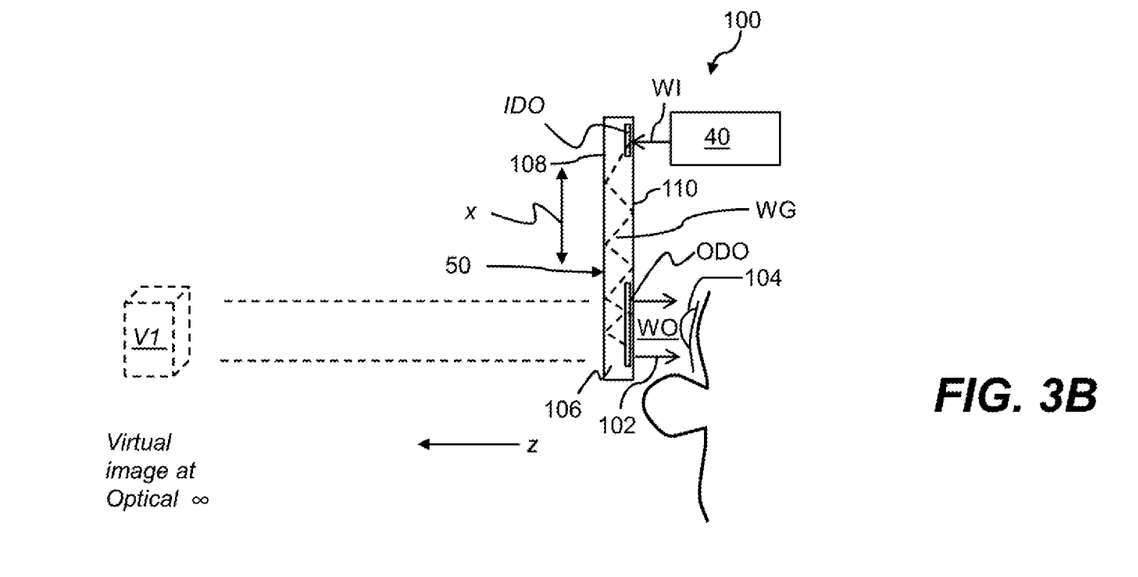
FIG. 3B is a top view of the near-eye display of FIG. 3A showing the projector interacting with components of an image light guide.

FIGS. 3A and 3B show orthogonal views of a near-eye display 100 incorporating both the projector 40 and the image light guide 50 for conveying the image generated by the projector 40 to an eyebox 102 within which the generated image can be viewed by a viewer's eye 104 as a virtual image V1 appearing within the viewer's field of view.

The image light guide 50 includes a transmissive waveguide 106 supporting an in-coupling optic IDO and an out-coupling optic ODO, which can both be formed as diffractive optics such as gratings or holographic optical elements (HOE). The in-coupling optic IDO directs the angularly encoded light beams WI from the projector 40 into the waveguide 106 for propagation along the waveguide 106 as the angularly encoded beams WG to the out-coupling optic ODO at which the angularly encoded light beams are directed out of the waveguide 106 as the angularly encoded beams WO to the eyebox 102 within which the virtual image V1 can be viewed. The waveguide 106 is transmissive and can have plane-parallel outer and inner surfaces 108, 110 through with the viewer can see the ambient environment within which the virtual image V1 appears. The in-coupling diffractive optic IDO can be located on the outer or inner surface 108, 110 of the waveguide 106 and can be of a transmissive or reflective type in a combination that supports the propagation of the angularly encoded beams from the output of the projector 40 to the eyebox 102.

For example, the angularly encoded beams WI from the projector 40 can be diffracted (generally through a first diffraction order) and thereby redirected by in-coupling optic IDO into the waveguide 106 as the angularly encoded beams WG for further propagation along a length dimension X of the waveguide 106 by total internal reflection (TIR) from the plane parallel outer and inner surfaces 108, 110. Although diffracted into a different combination of angularly related beams in keeping with the boundaries set by TIR, the angularly encoded beams WG preserve the image information in an angularly encoded form that is derivable from the parameters of the in-coupling optic IDO. The out-coupling optic ODO receives the angularly encoded beams WG and diffracts (also generally through a first diffraction order) the angularly encoded beams WG out of the waveguide 106 as the as the angularly encoded beams WO toward the eyebox 102, within with the transmitted virtual image can be seen by a viewer's eye 104. The out-coupling optic ODO can be designed symmetrically with respect to the in-coupling optic IDO to restore the original angular relationships of the angularly encoded beams WI among outputted angularly related beams WO within the eyebox 102. In addition, the out-coupling diffractive optic ODO can modify the original field points' positional angular relationships producing an output virtual image at a finite focusing distance.

However, to increase one dimension of overlap among the angularly related beams WO populating the eyebox 102 defining the size of the region within which the virtual image can be seen, the out-coupling optic ODO can be arranged together with a limited thickness of the waveguide 106 to encounter the angularly related beams WG multiple times and to diffract only a portion of the each of the angularly related beams WG upon each encounter. The multiple encounters along the length of the out-coupling optic ODO have the effect of enlarging one dimension of each of the angularly related beams WO exiting the waveguide 106 thereby expanding one dimension of the eyebox 102 within which the beams WO overlap. The expanded eyebox 102 decreases sensitivity to the position of a viewer's eye for viewing the virtual image V1.

Additional optics, such as a turning optic, can also be arranged along the waveguide 106 for supporting additional functions such as beam expansion. For example, the turning optic can be arranged for expanding a second dimension of the angularly related beams WO via multiple encounters with the angularly related beams WO propagating in a different direction along the waveguide 106.

In these figures, the path of principal rays of light exiting from the waveguide 106 is indicated in solid lines. Dashed lines depict extensions of the principal rays indicating the apparent location of the virtual image V1 to the eye 104 of the viewer. That is, the dashed rays indicate the apparent source of the modulated light that forms the virtual image V1.

Figure 4:
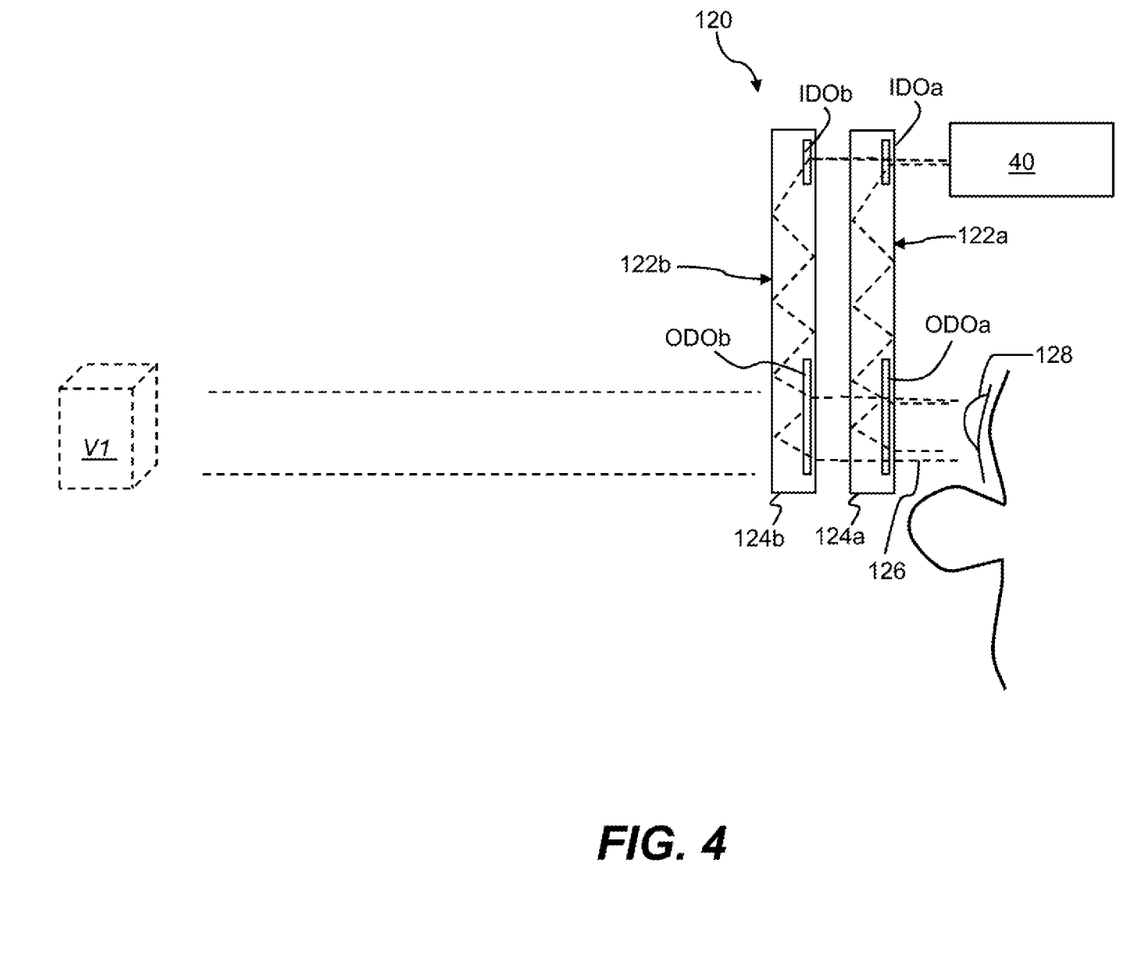
FIG. 4 is a top view of a near-eye display with two stacked image light guides for conveying different color bands of the images generated by the projector to a viewer's eye according to an embodiment of the present disclosure.

A near-eye display 120 shown in FIG. 4 includes a first image light guide 122a and a second image light guide 122b for conveying different color bands of the images generated by the projector 40. For example, the first image light guide 122a, which includes a first transmissive waveguide 124a with a first in-coupling optic IDOa and a first out-coupling optic ODOa, can be arranged for conveying a red and green color band (e.g., light from the red and green light sources 32 and 34) from the projector 40 to an eyebox 126. The second image light guide 122b, which includes a second transmissive waveguide 124b with a second in-coupling optic IDOb and a second out-coupling optic ODOb, can be arranged for conveying a blue color band (e.g., light from the blue light sources 36). In the form of diffractive optics, for example, the in-coupling and out-coupling optics IDOa, IDOb and ODOa, ODOb can be specially adapted to diffracting the angularly encoded beams in different wavelength bands to promote the propagation of the different wavelength bands along the respective waveguides 124a, 124b to the viewer's eye 128. Both waveguides 124, 126 can have plane-parallel front and back surfaces for maintaining angular relationships among the angularly related beams through multiple internal reflections. The plane-parallel surfaces also reduce refractive effects on transmissions of higher incident angle light through the waveguides 124a, 124b from the projector 40 or from the ambient environment within the field of view of the viewer.

Figure 6:
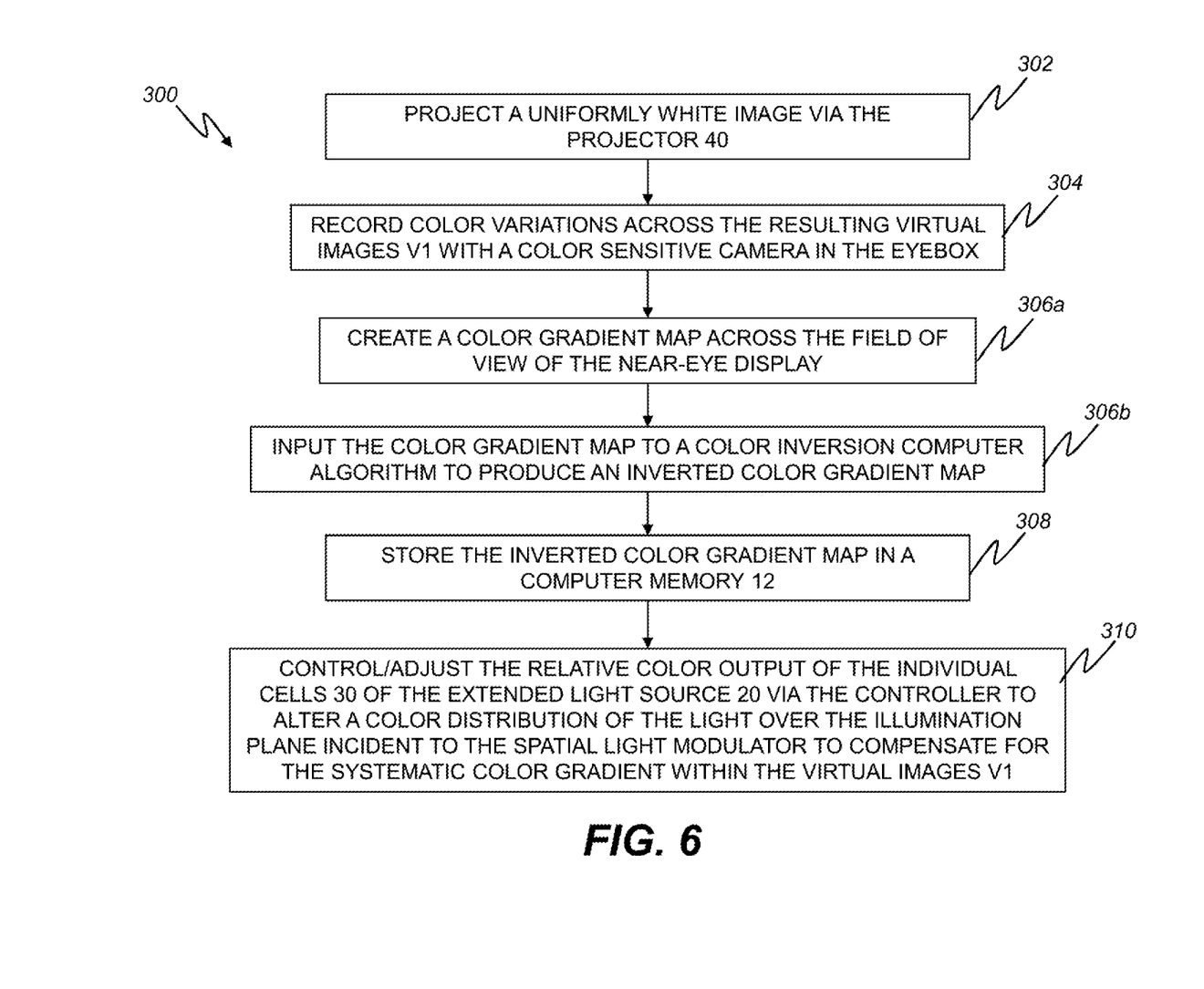
FIG. 6 is a flow diagram in accordance with a method and apparatus according to an embodiment of the present disclosure.

Systematic color gradients in the virtual images V1 of near-eye displays such as the near-eye displays 100 and 120 can be identified in many ways. In an embodiment, as shown in FIG. 6, a way to identify systematic color gradients 300 includes projecting a uniformly white image with the projector 40 in step 302 and recording color variations across the resulting virtual images V1 with a color sensitive camera in the wearer's eye position (i.e., eyebox) in step 304. The camera captured color gradient map across the field of view of the near-eye display provided in step 306a can be used as input to a color inversion computer algorithm in step 306b, and the color inversion computer algorithm can produce an inverted color gradient map. Such an inverted color gradient map can be stored in the memory 16 of the computer 12 that is connected to the extended light source 10 as shown in FIG. 1, in step 308. The inverted color gradient map is a color map that when combined with (added to) the original camera captured color gradient map results in a white color over the entire FOV. The controller 20 can be used to control the relative color output of the individual cells 30 of the extended light source 10 as shown in FIG. 1 to compensate for the systematic color gradient within the virtual images V1 in step 310.

One method of defining the required inverted color map is to separately power the R, G, B light source 32, 34, 36 of each light source cell 30 and to separately measure the intensity of each color across the extent of the virtual image. The variations in each component color across the virtual image (for each image point) can be written as:

measured $R$ light=$nRM\ R$ measured $G$ light=$nGM\ G$ measured $B$ light=$nBM\ B$ The inverted color map can then be determined, for each measured image point, as:

invert $R = nRW - nRM$ invert $G = nGW - nGM$ invert $B = nBW - nBM$

Where nRM, nGM, nBM are the measured values from an area of the FOV and of each red, green, and blue component, respectively, and where nRW, nGW, nBW are the required amounts of each of red, green, and blue light to form a white color image. The computer 12 and the controller 20, as shown in FIG. 1, can then be programed with the inverted color map, the invert R, invert G, invert B values per area of the FOV corresponding to the image generating area of the spatial light modulator 44. The controller 20 can adjust the amount of each component R, G, B of light generated in each light source cell 30 to reproduce the inverted color map at the output of the spatial light modulator 44, while the spatial light modulator 44 is otherwise set for generating a fully white image. That is, while the spatial light modulator 44 is set for generating a blank white image, the illuminator 42 can be arranged to produce a light pattern at the illumination plane 62 such that the image generated by the spatial light modulator 44 matches the inverted color map. The same illumination pattern can be maintained for while other images are generated by the spatial light modulator 44 to compensate for a systematic color gradient that would otherwise degrade the virtual images presented to the viewer.

Figure 7:
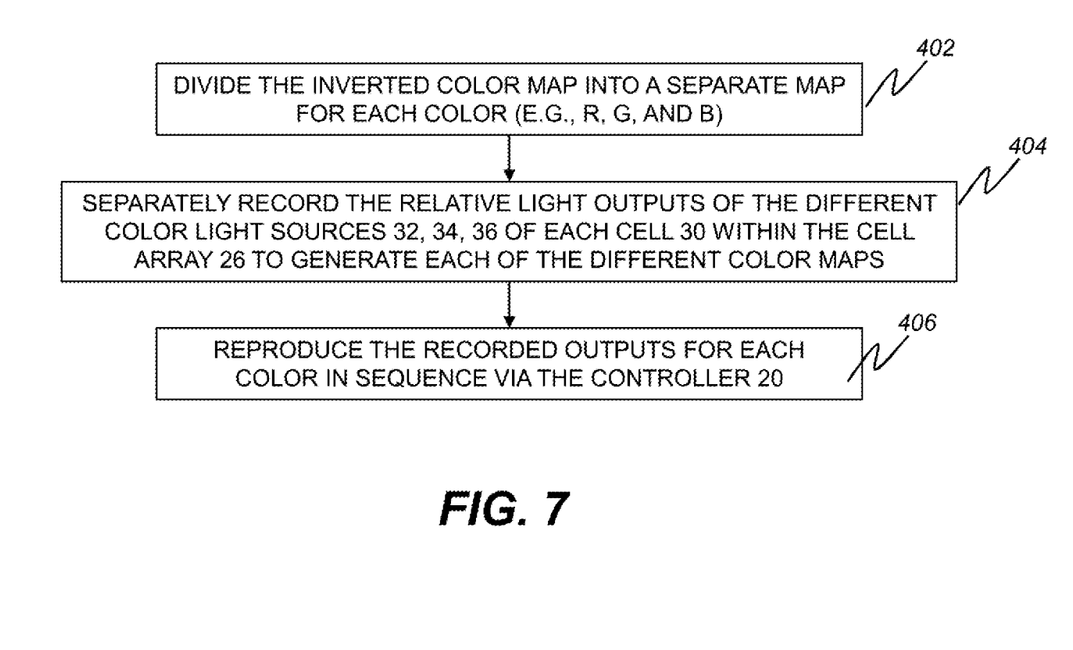
FIG. 7 is a flow diagram in accordance with a method and apparatus according to an embodiment of the present disclosure

For spatial light modulators that sequentially process different colors within the integration interval of the viewer's eye, the illuminator 42 can reproduce the inverted color map in synchronization with the sequential operation of the spatial light modulator. That is, in an embodiment, as shown in FIG. 7, the inverted color map can be divided into a separate map for each color (e.g., R, G, and B) in step 402. The relative light outputs of the different color light sources 32, 34, and 36 of each cell 30 within the cell array 26 are separately recorded for generating each of the different color maps in step 404 and the recorded outputs for each color are reproduced by the controller 20 in sequence in step 406. Similarly, where a separate spatial light modulator is used for each different color (e.g., R, G, and B), the extended light source 10 can be divided into three different extended light sources with a single color light source within each cell of each extended light source. The controller for each extended light source provides for reproducing a separate color map for each color that illuminates a different one of the spatial light modulators.

Figure 8:
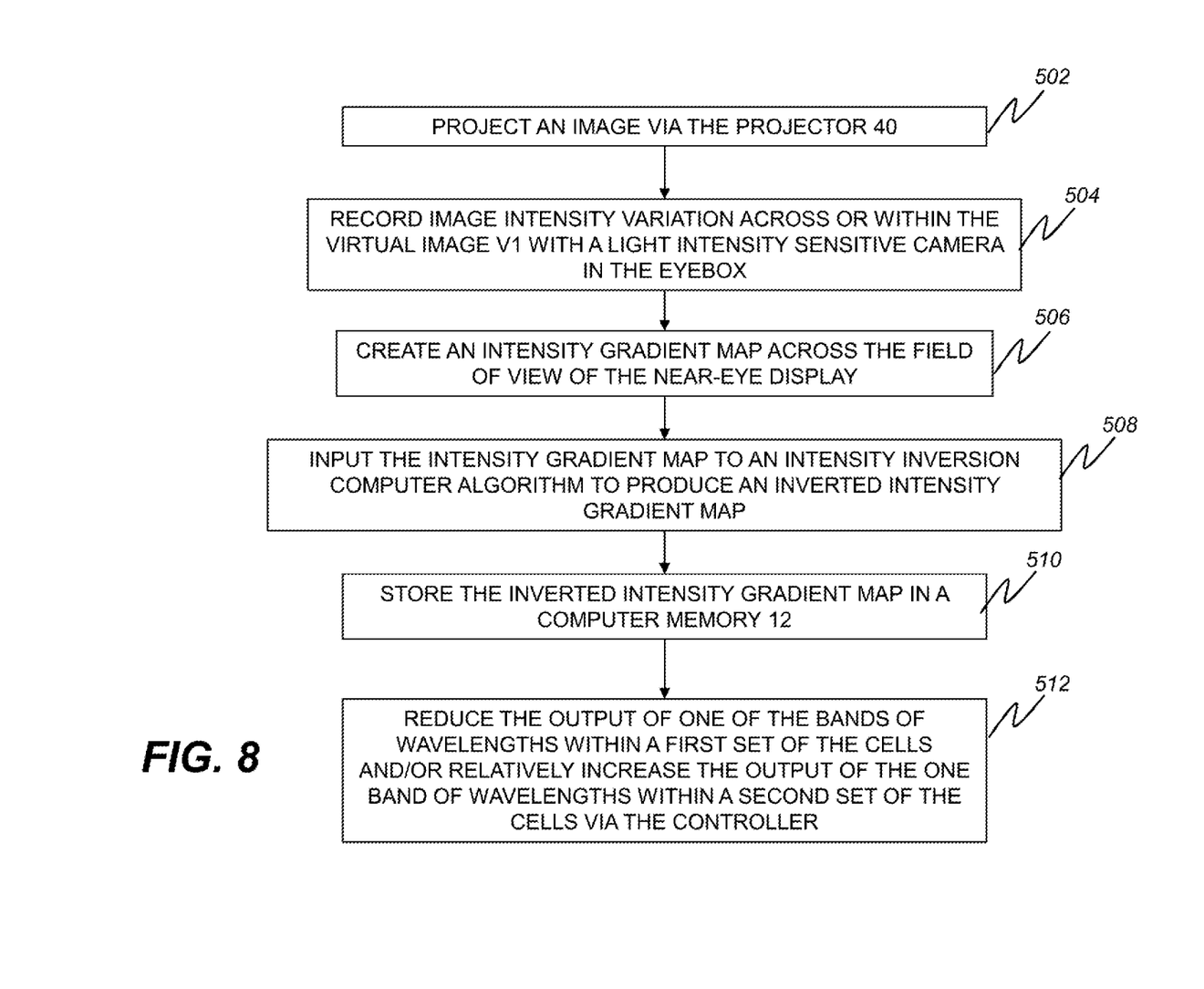
FIG. 8 is a flow diagram in accordance with a method and apparatus according to an embodiment of the present disclosure

While color balancing across the virtual images V1 can be performed by controlling ratios among the additive colors (e.g., R, G, and B) across the illumination plane 62, light intensity across the virtual images V1 can also be controlled by regulating the outputs of the different cells 30 of the extended light source 10. For example, where image intensity varies in an undesirable manner across or within the virtual images V1, the radiant energy outputs of the different cells 30 can be adjusted by the controller 20 to produce an inverse intensity distribution at the illumination plane 62 to provide the desired intensity balance across the virtual images V1. Conversely, where virtual images are limited to within predetermined portions of the virtual image field, such as within a subset or cluster of the pixels of the spatial light modulator 44, light cells 30 that do not contribute to the subset of pixels can be dimmed up to being turned off to enhance display contrast and to reduce the seepage of unwanted light into unused portions of the virtual image field. In an embodiment, as shown in FIG. 8, an inverted light intensity gradient map can be created as described in steps 502-506, stored in computer memory 12 in step 510, and light intensity across the virtual images V1 can be controlled by reducing the output of one of the bands of wavelengths within a first set of the cells 30 and relatively increasing the output of the one band of wavelengths within a second set of the cells 30 via the controller 20 in step 512.

Figure 5:
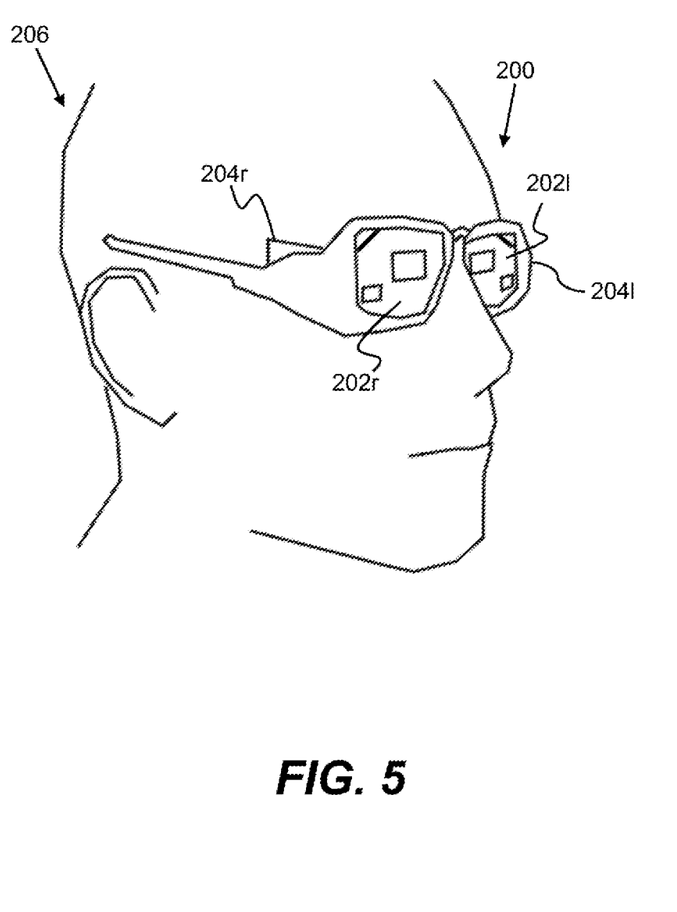
FIG. 5 is a perspective view of a head mounted display in the form of eyeglasses with separate near-eye displays for the wearer's two eyes according to an embodiment of the present disclosure.

The perspective view of FIG. 5 shows a head-mounted display (HMD) 200 in the form of eyeglasses with a left-eye near-eye display 202l and a right-eye near-eye display 202r for providing three-dimensional (3-D) augmented reality viewing. The respective projectors 204l, 204r of the near-eye displays 202l, 202r can provide respective color images that appear as virtual images within the real-world scene content seen by the wearer 206 through the near-eye displays 202l, 202r. The images that are generated can be, but are not limited to, a stereoscopic pair of images for 3-D viewing of virtual objects.

Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to one eye. The HMD 200 can include color gradient adjustment as disclosed in the preceding figures and the accompanying descriptive text. In this way, color gradient corrections can be applied to both right and left eyes independently to produce color correct 3D-virtual images the wearer.

It is to be understood that the RGB three-color display system is an illustrative example in this disclosure, there are also other color display schemes that could be utilized to create white light for backlight and/or front-light projector systems. For example, a four-color scheme, where yellow light is added as an additional light source to the three-color scheme, designated as RGBY, exist and could be utilized. The above disclosure is extended to such four (or more) color schemes that may be implemented into the projector system.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

The invention claimed is:

1. A projector for a near-eye display, comprising:
an extended light source having a plurality of cells each containing different color light sources that are adjustable to vary relative color output of individual cells;
a partial homogenizer configured to collect light from the plurality of cells within a plurality of optical channels and partially overlapping the light from the plurality of optical channels at an illumination plane;
a spatial light modulator located at the illumination plane configured to generate real images by selectively modulating the partially overlapping light at the illumination plane;
an eyepiece optic configured to direct the modulated light from the spatial light modulator toward a pupil to convey virtual images of the generated real images to a viewer; and
a controller connected to the extended light source, wherein the controller is operable to adjust the relative color output of one or more of the plurality of cells to alter a color distribution of the light over the illumination plane incident to the spatial light modulator.

2. The projector of claim 1, wherein the different color light sources within each of the plurality of cells are operable to emit at least three different bands of wavelengths, the relative light output of the different bands of wavelengths being relatively adjustable.

3. The projector of claim 2, wherein the controller is configured to relatively reduce the output of one of the bands of wavelengths within a first set of the plurality of cells and configured to relatively increase the output of the one of the band of wavelengths within a second set of the plurality of cells.

4. The projector of claim 3, wherein light from the first and second sets of the plurality of cells is relatively offset within the illumination plane.

5. The projector of claim 1, wherein the partial homogenizer includes a condenser operable to partially overlap the light from the plurality of optical channels at the illumination plane in a position that is offset from a focal plane of the condenser.

6. The projector of claim 1, wherein the partial homogenizer includes a first array lens and a second array lens configured to transmit the light from the plurality of cells within the plurality of optical channels.

7. The projector of claim 6, wherein the first array lens and the second array lens comprise respective arrays of lenslets, and the first array lens directs light collected from the plurality of cells into respective apertures of the lenslets of the second array lens.

8. The projector of claim 7, wherein a condenser is arranged with respect to the first and second array lenses and configured to image lenslet apertures of the first array lens in an overlapping manner at a homogenization plane from which the illumination plane is offset.

9. The projector of claim 1, wherein the partial homogenizer is configured to collect light from the plurality of cells within the plurality of optical channels and to overlap the plurality of optical channels by at least 60 percent at the illumination plane, wherein at least some of the plurality of optical channels overlap by no more than 90 percent at the illumination plane.

10. The projector of claim 1, wherein the controller is configured to adjust radiant energy outputs of one or more of the plurality of cells to alter a light intensity distribution over the illumination plane incident to the spatial light modulator.

11. The projector of claim 10, wherein the controller is configured to dim the one or more of the plurality of cells otherwise illuminating portions of the spatial light modulator that are not being used for image formation.

12. A near-eye display, comprising:
an illuminator including an extended light source having a plurality of cells each comprising different color light sources and a partial homogenizer configured to partially overlap light from the plurality of cells at an illumination plane;
a spatial light modulator located at the illumination plane configured to generate real images by selectively modulating the partially overlapping light at the illumination plane;
an eyepiece optic configured to direct the modulated light from the spatial light modulator toward a pupil as a plurality of angularly encoded light beams;
an image light guide comprising a transmissive waveguide an in-coupling optic arranged along the waveguide, wherein the in-coupling optic is operable to direct at least a portion of the angularly encoded light beams into the waveguide, and an out-coupling optic arranged along the waveguide, wherein the out-coupling optic is operable to direct at least a portion of the angularly encoded light beams out of the waveguide to an eyebox; and
a controller connected to the extended light source, wherein the controller is operable to adjust a relative color output of one or more of the plurality of cells to change a color distribution of the light over the illumination plane incident to the spatial light modulator.

13. The near-eye display of claim 12, wherein the partial homogenizer is configured to collect light from the plurality of cells within a plurality of optical channels and to overlap the plurality of optical channels by at least 60 percent at the illumination plane wherein at least some of the plurality of optical channels overlap by no more than 90 percent at the illumination plane.

14. The near-eye display of claim 12, wherein the partial homogenizer includes a condenser configured to partially overlap the light from the plurality of cells at the illumination plane in a position that is offset from a focal length of the condenser.

15. The near-eye display of claim 12, wherein the partial homogenizer includes a first array lens with lenslets configured to collecting light from the plurality of cells, a second array lens with lenslets having respective apertures within which the collected light from the plurality of cells is directed, and a condenser that is arranged with respect to the first and second array lenses and configured to image lenslet apertures of the first array lens in an overlapping manner at a homogenization plane from which the illumination plane is offset.

16. The near-eye display of claim 12, wherein the different color light sources within each of the plurality of cells are operable to emit at least three different bands of wavelengths with the relative light output of the different bands of wavelengths being adjustable.

17. The near-eye display of claim 16, wherein the controller is configured to relatively reduce the output of one of the bands of wavelengths within a first set of the plurality of cells and configured to relatively increase the output of the one band of wavelengths within a second set of the plurality of cells.

18. The near-eye display of claim 17, wherein light from the first and second sets of the plurality of cells is relatively offset within the illumination plane.

19. The near-eye display of claim 12, wherein the controller is configured to adjust radiant energy outputs of one or more of the plurality of cells to alter a light intensity distribution over the illumination plane incident to the spatial light modulator to adjust light intensity distributions over a virtual images.

20. The near-eye display of claim 19, wherein the controller is configured to dim the one or more of the plurality of cells illuminating portions of the spatial light modulator that are not being used for image formation.

* * * * *